(12) United States Patent
Soto et al.

(10) Patent No.: US 9,704,268 B2
(45) Date of Patent: Jul. 11, 2017

(54) DETERMINING INFORMATION FROM IMAGES USING SENSOR DATA

(71) Applicant: BROADCOM CORPORATION, Irvine, CA (US)

(72) Inventors: Walter Glenn Soto, San Clemente, CA (US); Frank Van Diggelen, San Jose, CA (US); Robert Americo Rango, Newport Coast, CA (US)

(73) Assignee: AVAGO TECHNOLOGIES GENERAL IP (SINGAPORE) PTE. LTD., Singapore (SG)

( * ) Notice: Subject to any disclaimer, the term of this patent is extended or adjusted under 35 U.S.C. 154(b) by 174 days.

(21) Appl. No.: 14/591,419

(22) Filed: Jan. 7, 2015

(65) Prior Publication Data
US 2015/0193923 A1 Jul. 9, 2015

Related U.S. Application Data

(60) Provisional application No. 61/925,581, filed on Jan. 9, 2014, provisional application No. 62/096,807, filed on Dec. 24, 2014.

(51) Int. Cl.
*G06T 7/00* (2017.01)
*G06T 7/60* (2017.01)
(Continued)

(52) U.S. Cl.
CPC ............... *G06T 7/60* (2013.01); *G06T 7/62* (2017.01); *G06T 7/70* (2017.01); *G06T 2200/24* (2013.01); *G06T 2207/20101* (2013.01)

(58) Field of Classification Search
CPC ....... G06T 7/007; G06T 7/00071; G06T 7/60; G06T 7/602; G06T 2200/24; G06T 2207/20101
See application file for complete search history.

(56) References Cited

U.S. PATENT DOCUMENTS 5,881,321 A * 3/1999 Kivolowitz ............ H04N 5/222 348/61
2007/0147813 A1* 6/2007 Washisu ............... G02B 27/646 396/53

(Continued)

FOREIGN PATENT DOCUMENTS

| CN | 101183206 A | 5/2008 |
| CN | 101437069 A | 5/2009 |

(Continued)

OTHER PUBLICATIONS

Keller, Friedrich, Willemsen, Thomas, Sternberg, Harald. "Calibration of Smartphone for the use in indoor navigation" 2012 IEEE.*

(Continued)

*Primary Examiner* — Kim Vu
*Assistant Examiner* — Molly Delaney
(74) *Attorney, Agent, or Firm* — McDermott Will & Emery LLP

(57) ABSTRACT

A device for determining information from images using sensor data may include at least one processor circuit. The at least one processor circuit may be configured to receive a series of images from an image capture device, where each image of the series of images includes a representation of a physical object. The at least one processor circuit may be further configured to receive a series of sensor data items from at least one sensor device, where each of the series of sensor data items corresponds to one of the sequence of images. The at least one processor circuit may be further configured to determine a physical length of the physical object based at least in part on the series of images and the corresponding series of sensor data items.

20 Claims, 9 Drawing Sheets

(51) Int. Cl.
    *G06T 7/70*     (2017.01)
    *G06T 7/62*     (2017.01)

(56) References Cited

U.S. PATENT DOCUMENTS

| | | | |
|---|---|---|---|
| 2008/0166019 A1* | 7/2008 | Lee | G06T 7/60 |
| | | | 382/106 |
| 2009/0090815 A1* | 4/2009 | Massimo | F03D 3/005 |
| | | | 244/155 A |
| 2010/0074609 A1* | 3/2010 | Kasama | G03B 13/18 |
| | | | 396/147 |
| 2010/0250183 A1* | 9/2010 | Willins | G01C 15/02 |
| | | | 702/150 |
| 2010/0316282 A1* | 12/2010 | Hope | G06T 7/0065 |
| | | | 382/154 |
| 2011/0288818 A1* | 11/2011 | Thierman | G01B 11/00 |
| | | | 702/159 |
| 2012/0194693 A1* | 8/2012 | Samadani | H04N 7/142 |
| | | | 348/222.1 |

FOREIGN PATENT DOCUMENTS

| | | |
|---|---|---|
| CN | 101959322 A | 1/2011 |
| CN | 102607423 A | 7/2012 |
| CN | 103167079 A | 6/2013 |
| WO | WO-2013/059599 A1 | 4/2013 |
| WO | WO-2013/146269 A1 | 10/2013 |

OTHER PUBLICATIONS

TapTapSoft: "Point & Measure," Feb. 2012, retrieved from <www.taptapsoft.com/our-apps/pointmeasure>.

Laotrakunchai, et al., "Measurement of Size and Distance of Objects Using Mobile Devices," Dec. 2013, IEEE 2013 International Conference on Signal-Image Technology & Internet-Based Systems, pp. 156-161.

* cited by examiner

FIG. 8

```
%testDistance.m global a;
global th;

%known a1, a2, a3
a = [ 0, 0, 0;
      5, 0, 0;
     10, 0, 0;
     15, 0, 0];
th = [18.4,15.3,11.3]*pi/180; %angles for x at [0,-15,0]

x0 = [0, -20, 0] ; %initial guess
options = optimset ('TolFun',0.5,'TolX', 0.001) ;
[x, fval,exitflag] = fsolve (@myfun, x0, options)
function F = myfun (x)
%x = 1x3 vector global a;
global th;
n = length (th) ; %number of equations for i=1:n
    [A,B,T] = findABT(a(i,:),a(i+1,:),x);
    F (i) = A^2 + B^2 -2*A*B*cos(th(i)) - T^2;
end fucntion [A,B,T] = findABT(a,b,x)
A = norm(b-x) ;
B = norm(a-x) ;
T = norm(a-b) ;
```

```
>>testDistance

Equation solved.

x=
    0.042662  -15.096    0
The actual values x are [0,-15,0] cm
The accuracy of the angle measurements are 0.1 degrees, this leads to a
computed value of x with accuracy of 0.1 cm.
```

DETERMINING INFORMATION FROM IMAGES USING SENSOR DATA

CROSS-REFERENCE TO RELATED APPLICATIONS

The present application claims the benefit of U.S. Provisional Patent Application Ser. No. 61/925,581, entitled "Determining Information From Images Using Sensor Data," filed on Jan. 9, 2014, and the benefit of U.S. Provisional Patent Application Ser. No. 62/096,807, entitled "Determining Information From Images Using Sensor Data," filed on Dec. 24, 2014, both of which are hereby incorporated by reference in their entireties for all purposes.

TECHNICAL FIELD

The present description relates generally to determining information from images, including determining information, such as three-dimensional information, from images using motion sensor data.

BACKGROUND

An electronic device, such as a mobile phone or a digital camera, may include one or more sensors, such as accelerometers and/or gyroscopes. The sensors may generate sensor data that is indicative of one or more movements of the mobile device, such as an acceleration of the mobile device, or an angular rate of movement of the electronic device. Some electronic devices may also include an image capture device, such as a camera, that may be used to capture images of physical objects.

BRIEF DESCRIPTION OF THE DRAWINGS

Certain features of the subject technology are set forth in the appended claims. However, for purpose of explanation, several embodiments of the subject technology are set forth in the following figures.

FIG. 8 illustrates an example motion diagram of an electronic device relative to a physical object having first and second locations and example MATLAB code in accordance with one or more implementations.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced using one or more implementations. In one or more instances, structures and components are shown in block diagram form in order to avoid obscuring the concepts of the subject technology.

The subject system allows an electronic device, such as a mobile phone, a tablet device, or any device that includes an image capture device and one or more sensor devices, to determine the physical length of a physical object represented in one or more images captured by the electronic device. In one or more implementations, the electronic device is continuously moved, e.g. via translational movement and/or rotational movement, while capturing a series of images of the physical object and generating a corresponding series of sensor data items that are indicative of the movement. The electronic device may then determine, based at least in part on the series of images and/or the corresponding series of sensor data items, the physical length of the physical object represented in the captured images.

Figure 1:
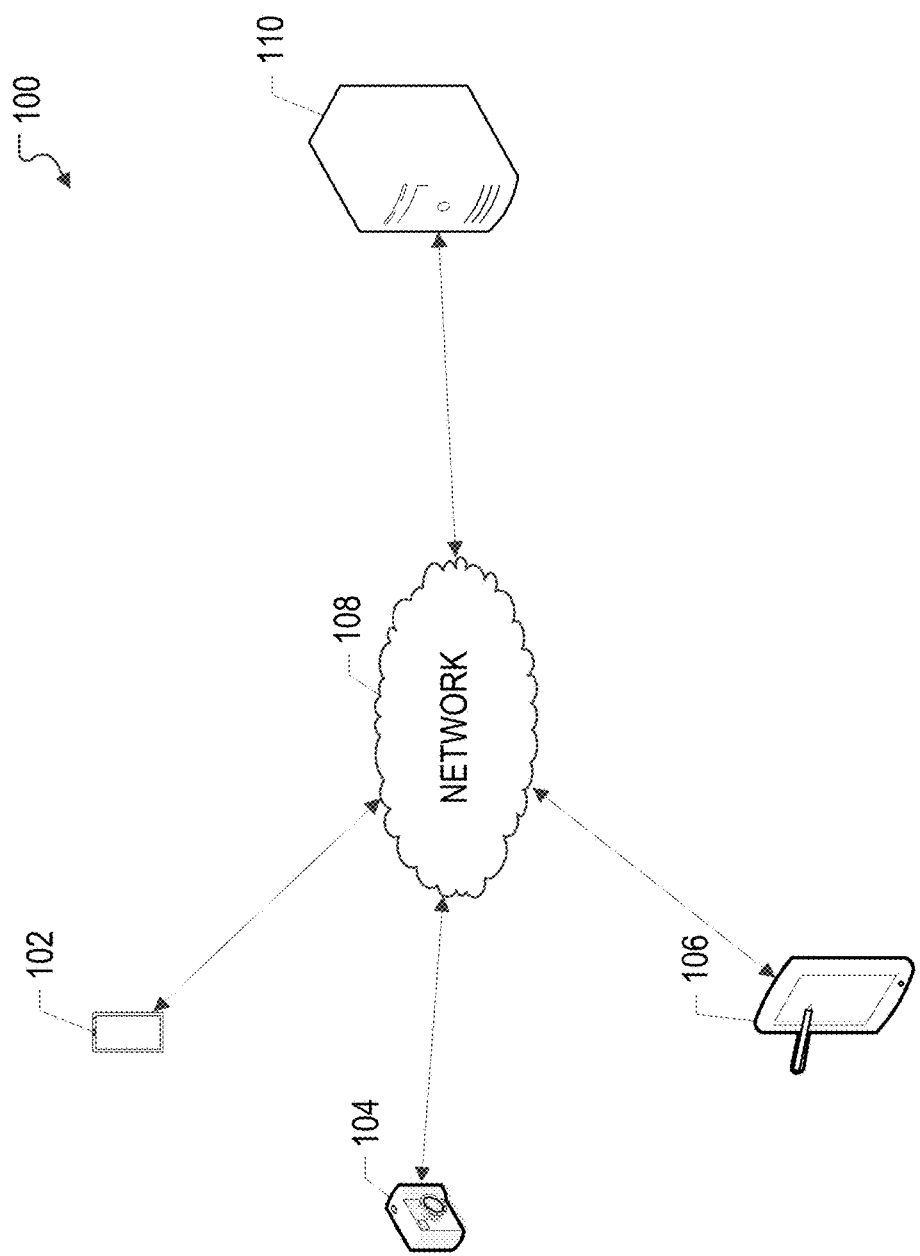
FIG. 1 illustrates an example network environment in which a system for determining information from images using sensor data may be implemented in accordance with one or more implementations may be implemented in accordance with one or more implementations.

FIG. 1 illustrates an example network environment 100 in which a system for determining information from images using sensor data may be implemented in accordance with one or more implementations. Not all of the depicted components may be required, however, and one or more implementations may include additional components not shown in the figure. Variations in the arrangement and type of the components may be made without departing from the spirit or scope of the claims as set forth herein. Additional, different or fewer components may be provided.

The example network environment 100 may include one or more electronic devices 102, 104, 106. In one or more implementations, one or more of the electronic devices 102, 104, 106 may be communicably connected to a server 110, such as by the network 108. In one or more implementations, one or more of the electronic devices 102, 104, 106 may not be connected to the server 110 and/or the network 108. The network 108 may be a public communication network (such as the Internet, cellular data network, dialup modems over a telephone network) or a private communications network (such as private local area network ("LAN"), leased lines).

In one or more implementations, one or more of the electronic devices 102, 104, 106 can be computing devices such as laptop computers, smartphones, tablet devices, portable media players, smart cameras, wearable devices, such as smart glasses and/or smart watches that have one or more processors coupled thereto and/or embedded therein, televisions or other displays with one or more processors coupled thereto and/or embedded therein, or other appropriate computing devices that can be used to, for example, display a graphical user interface. In one or more implementations, one or more of the electronic devices 102, 104, 106 may include, and/or may be communicatively coupled to, an image capture device, such as a camera. In one or more implementations, one or more of the electronic devices 102, 104, 106 may include, and/or may be communicatively coupled to, one or more sensors and/or one or more sensor devices, such as one or more accelerometers and/or one or more gyroscopes.

In the example of FIG. 1, the electronic device 102 is depicted as a smartphone, the electronic device 104 is depicted as a smart camera, and the electronic device 106 is depicted as a tablet device. In one or more implementations, one or more of the electronic devices 102, 104, 106 may be, or may include all or part of, the electronic system that is discussed further below with respect to FIG. 9.

In one example, the server 110 may be a computing device such as a computer server, a smart phone, a tablet device, or generally any computing device. In another example, the server 110 may represent one or more computing devices (such as a cloud of computers and/or a distributed system) that are communicatively coupled, such as communicatively coupled over the network 108, that collectively, or individually, perform one or more functions that can be performed server-side, such as image processing. In one or more implementations, the server 110 may include additional resources, such as additional processing resources, than one or more of the electronic devices 102, 104, 106, and one or more of the electronic devices 102, 104, 106, may transmit data, such as image data, to the server 110 in order to utilize the additional processing resources of the server 110, e.g. for image processing. In one or more implementations, the server 110 may be coupled with various databases, storage services, or other computing devices.

In the subject system, one or more of the electronic devices 102, 104, 106, such as the electronic device 102, may include an image capture device, such as a camera, an output device, such as a display and/or screen, one or more accelerometers, and one or more gyroscopes. The electronic device 102 may determine three-dimensional measurements of a physical object represented within one or more images by means of image capture, e.g. using at least the image capture device, image processing, e.g. using at least the electronic device 102 and/or the server 110, and by motion measurement, e.g. using at least the accelerometer and/or the gyroscope. For example, the electronic device 102 may determine a physical length of a physical object represented in the images. In one or more implementations, the motion measurements may be acceleration data items corresponding to a translation and/or angular rate data items corresponding to a rotation. In one or more implementations, the electronic device 102 may utilize the subject system to determine a physical length of a physical object represented within one or more of the images.

The electronic device 102 displays, e.g. on the output device, a user interface that includes an image captured by the image capture device, such as the image currently being captured by the image capture device. For example the electronic device 102 may continuously update the user interface to display the image currently being captured by the image capture device. The electronic device 102 may recognize the edges of a representation of a physical object in the image, e.g. against a uniform background. In one or more implementations, the electronic device 102 may transmit one or more images to the server 110, the server 110 may process the image to recognize the edges of the representation of the physical object, and the server 110 may transmit an indication of the edges to the electronic device 102.

The electronic device 102 overlays graphical indicators, such as a first and second dot, over first and second points that are on opposite edges of the representation of the physical object displayed on the user interface, such that a line from the first point to the second point spans a length of the physical object. The electronic device 102 may overlay another graphical object, such as a white circle, over one of the dots, such as the first dot. In order to initiate a measurement of the physical object represented in the captured image, the electronic device 102 may display a prompt indicating that the electronic device 102 should be moved, e.g. via translational movement and/or rotational movement, while keeping the representation of the physical object within the captured image, such that the white circle is moved, within the user interface, from the first dot to the second dot.

As the electronic device 102 is moved, the electronic device 102 may move the white circle within the user interface in correlation with the movement of the electronic device 102. Although the location of the object within the image may change as the electronic device 102 is moved, the one or more dots overlaid along the edges of the object may be kept in place by image recognition and/or image processing, such as image processing by the electronic device 102 and/or by the server 110. The electronic device 102 may display a prompt or warning if the electronic device 102 is moved too quickly and/or too slowly.

As the electronic device 102 is moved to different positions, the image capture device captures a series of images of the physical object from different angles/positions, while the one or more sensors of the electronic device 102 generate a series of sensor data items that are indicative of the movement of the electronic device 102 from position to position. After the electronic device 102 has captured the series of images and the corresponding series of sensor data items, the electronic device 102 may process the series of images and/or the series of sensor data items to determine a physical length of the physical object, as is discussed further below with respect to FIGS. 3-8.

The electronic device 102 may display the physical length of the physical object overlaid on the representation of the physical object within the user interface, as is discussed further below with respect to FIG. 4. Thus, the subject system allows the electronic device 102 to determine and display the physical length of a physical object that is represented within one or more images captured by the electronic device 102. In one or more implementations, the subject system may be used to determine the size of a foot, the height of a person, or generally the physical length and/or physical size of any physical object that is at least partially displayed within an image captured by the electronic device 102.

In one or more implementations, only a first portion of the physical object may be represented in the initial image captured by the electronic device 102. As the electronic device 102 is moved, the captured images are continually processed and additional edges of the representation of the physical object are continually recognized. The electronic device 102 may add one or more dots to the edges of the representation of the physical object as the edges become visible. In one or more implementations, as the electronic device 102 is moved, the first portion of the physical object, and the first dot, may no longer be represented in one or more of the captured images that contain the remaining portion of the physical object and the second dot.

Figure 2:
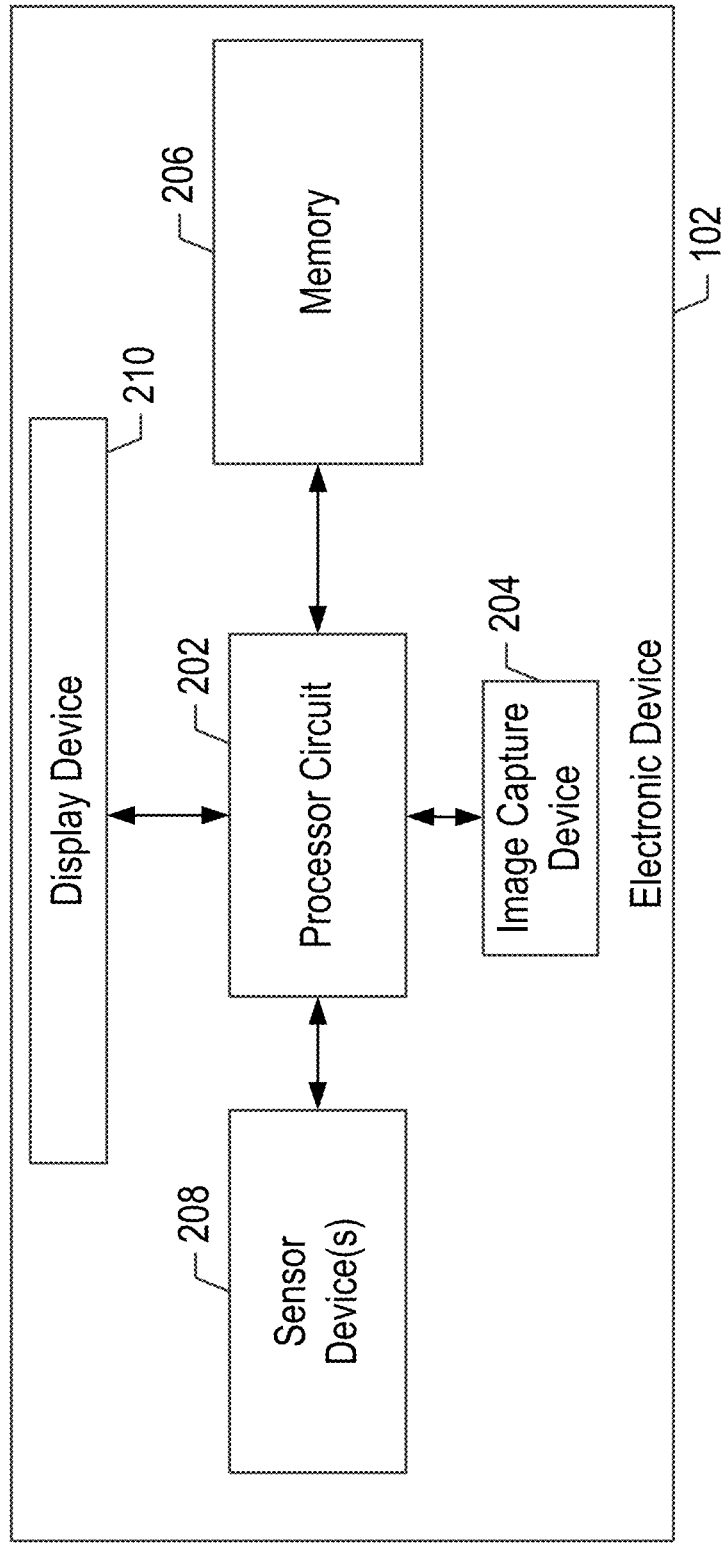
FIG. 2 illustrates an example electronic device in accordance with one or more implementations.

FIG. 2 illustrates an example electronic device 102 in accordance with one or more implementations. Not all of the depicted components may be used, however, and one or more implementations may include additional components not shown in the figure. Variations in the arrangement and type of the components may be made without departing from the spirit or scope of the claims as set forth herein. Additional components, different components, or fewer components may be provided.

The example electronic device 102 includes one or more processor circuits 202, a memory 206, an image capture device 204, a display device 210, and one or more sensor devices 208. The image capture device 204 may be a camera, or other device capable of capturing an image of a physical area, such as a physical area including a physical object. The one or more sensor devices 208 may include, for example, one or more accelerometers and/or one or more gyroscopes, such as a rate gyroscope. The one or more sensor devices 208 may determine motion data, such as acceleration and/or angular rate data as the image capture device 204 captures images while in motion. Thus, the motion data is associated with the captured images via a timing relationship. The display device 210 may be a screen or other device capable of displaying captured images. In one or more implementations, the configuration of the electronic device 104 and/or the electronic device 106 may be the same or similar to the configuration of electronic device 102 shown in FIG. 2.

In one or more implementations, one or more of the processor circuit 202, the image capture device 204, the memory, and/or the one or more sensor devices 208 may be implemented in software (e.g., subroutines and code). In one or more implementations, one or more of the processor circuit 202, the image capture device 204, the memory 206, the display device 210, and/or the one or more sensor devices 208 may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both. Additional features and functions of these modules according to various aspects of the subject technology are further described in the present disclosure.

Figure 3:
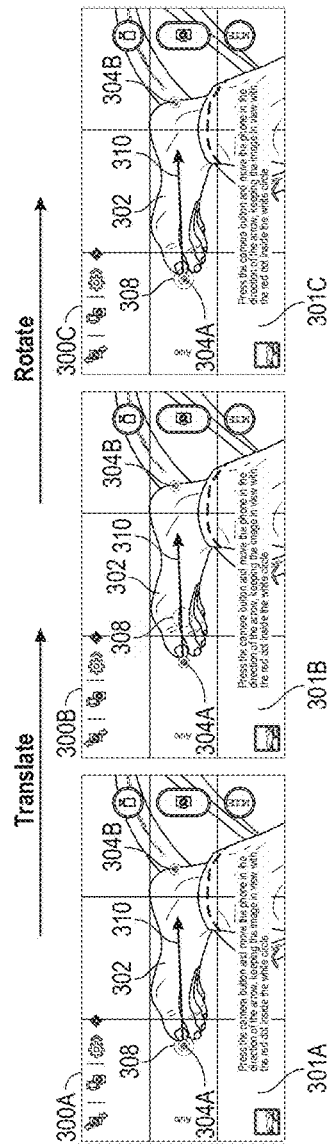
FIG. 3 illustrates example user interfaces in accordance with one or more implementations.

FIG. 3 illustrates example user interfaces 300A-C in accordance with one or more implementations. Not all of the depicted components may be used, however, and one or more implementations may include additional components not shown in the figure. Variations in the arrangement and type of the components may be made without departing from the spirit or scope of the claims as set forth herein. Additional components, different components, or fewer components may be provided.

In one or more implementations, the user interface 300A may be displayed by one or more of the electronic devices 102, 104, 106, such as via the display device 210 of the electronic device 102. The user interfaces 300A-C each include captured images 301A-C which include a representation 302 of a physical object, a first point 304A on the representation 302, a second point 304B on the representation 302, a motion indicator 308, and a directional indicator 310. The first point 304A may correspond to a first location on the physical object and the second point 304B may correspond to a second point on the physical object. A line between the first and second points 304A-B may span a length or width of the representation of the physical object. The captured images 301A-C may be captured by the image capture device 204 of the electronic device 102.

The electronic device 102 may use image processing to identify the edges of the representation 302 of the physical object and automatically identify the first and second points 304A-B as points between which a line will span the length and/or width of the representation 302. In one or more implementations, one or more of the first and second points 304A-B may be determined from user input, such as a user interacting with a touchscreen or other interface device of the electronic device 102.

In order to initiate a measurement of the physical object, the user interface 300A prompts the user to perform a translation and/or rotation of the electronic device 102 to move the motion indicator 308 across the length of the representation 302 of the physical object, such as in the direction indicated by the directional indicator 310. The image capture device 204 may continuously capture images of the physical object as the electronic device 102 is moved. The motion indicator 308 may move in a direction corresponding to the translation and/or rotation performed with the electronic device 102. The electronic device 102 may utilize sensor data items received from the one or more sensor devices 208 to determine the movement performed by the user on the electronic device 102.

In one or more implementations, the user interface 300B may be displayed by the electronic device 102 after displaying the user interface 300A such as when the user performs a translation movement with the electronic device 102. As shown in the user interface 300B, the motion indicator 308 has moved to reflect that the user has performed a translation movement with the electronic device 102.

In one or more implementations, the user interface 300C may be displayed by the electronic device 102 after displaying the user interface 300B such as when the user performs a rotational movement with the electronic device 102. As shown in the user interface 300C, the motion indicator 308 has moved back over the first point 304A to reflect that the user has performed a rotational movement with the electronic device 102, e.g. in a direction opposite to the direction of the translational movement. The image capture device 204 of the electronic device 102 may continuously capture images of the physical object while the user moves the electronic device 102.

In one or more implementations, the user interface 300A may instruct the user to first perform a rotation with the electronic device 102, e.g. to move the motion indicator 308 from the first point 304A to the second point 304B, or vice-versa. The electronic device 102 may obtain angular rate data items from the rotation, e.g. via the sensor device 208, that correspond with the series of images captured during the rotation. The user interface 300A may then instruct the user to perform a translation with the electronic device 102, e.g. to move the motion indicator 308 from the second point 304B back to the first point 304A. The electronic device 102 may obtain acceleration data items from the translation, e.g. via the one or more sensor devices 208, that correspond with a series of images captured during the translation. The electronic device 102 may then utilize one or more of the angular rate data items and/or one or more of the acceleration data items along with the series of captured images to determine the coordinates of the first and second locations of the physical object, as is discussed further below with respect to FIGS. 4-8. In one or more implementations, the order of the rotational movement and the translational movement may be reversed.

Figure 4:
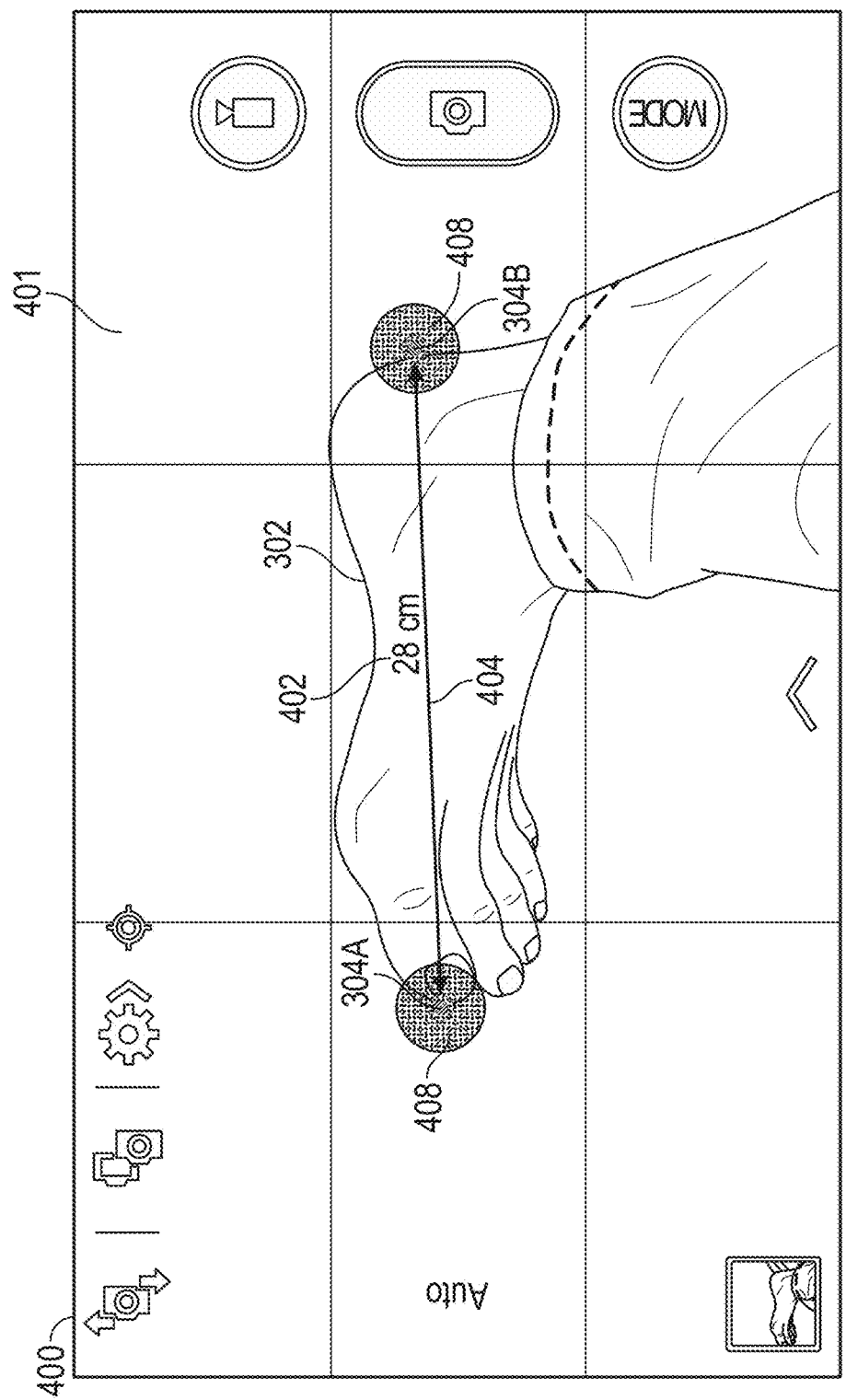
FIG. 4 illustrates an example user interface in accordance with one or more implementations.

FIG. 4 illustrates an example user interface 400 in accordance with one or more implementations. Not all of the depicted components may be used, however, and one or more implementations may include additional components not shown in the figure. Variations in the arrangement and type of the components may be made without departing from the spirit or scope of the claims as set forth herein.

Additional components, different components, or fewer components may be provided.

The user interface 400 includes a captured image 401 including the representation 302 of the physical object, the first and second points 304A-B, an indication 402 of a physical length of the physical object, a length line 404, and one or more accuracy indicators 408. In one or more implementations, the electronic device 102 may display the user interface 400 after the user has moved the electronic device 102 such that the motion indicator 308 of FIG. 3 has moved across the length of the representation 302 of the physical object, e.g. from the first point 304A to the second point 304B, and after the electronic device 102 has determined the physical length of the physical object.

The electronic device 102 may overlay the indication 402 of the physical length of the physical object, and the length line 404, onto the representation 302 of the physical object. In one or more implementations, the indication 402 may be a numerical value and corresponding units that indicate the physical length. In one or more implementations, the indication 402 may be a graphical indication that conveys a particular size. The electronic device 102 may overlay the accuracy indicators 408 onto the first and second points 304A-B. The accuracy indicators 408 may indicate an accuracy of the indication 402 of the physical length. In one or more implementations, the larger the size of the accuracy indicators 408, the less accurate the indication 402 of the physical length is, and the smaller the size of the accuracy indicators 408, the more accurate the indication 402 of the physical length is, or vice-versa.

Figure 5:
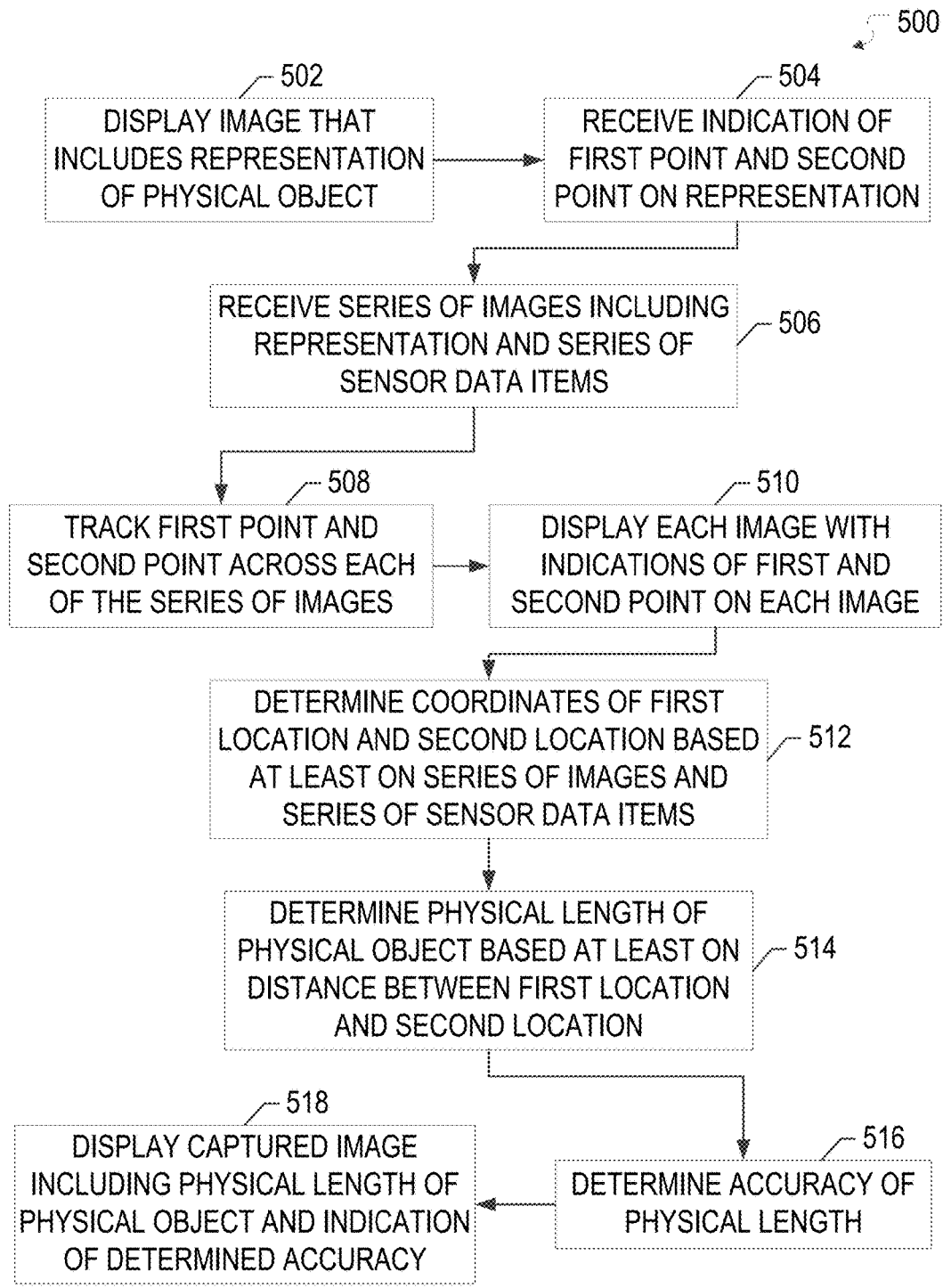
FIG. 5 illustrates a flow diagram of an example process of an electronic device in accordance with one or more implementations.

FIG. 5 illustrates a flow diagram of an example process of an electronic device 102 in accordance with one or more implementations. For explanatory purposes, the example process 500 is primarily described herein with reference to the electronic device 102 of FIGS. 1-2; however, the example process 500 is not limited to the electronic device 102 of FIGS. 1-2, e.g. the example process 500 may be performed by one or more of the electronic devices 104, 106 and/or the server 110, and/or the example process 500 may be performed by one or more components of the electronic device 102. Further for explanatory purposes, the blocks of the example process 500 are described herein as occurring in serial, or linearly. However, multiple blocks of the example process 500 may occur in parallel. In addition, the blocks of the example process 500 may be performed a different order than the order shown and/or one or more of the blocks of the example process 500 may not be performed.

The electronic device 102 displays an image that includes a representation 302 of a physical object (502). For example, the image capture device 204 may capture an image of a physical object and the image may be displayed by the display device 210, such as via the user interfaces discussed above with respect to FIGS. 3 and 4. The electronic device 102 receives an indication of a first point 304A and a second point 304B on the representation 302, where the first point 304A corresponds to a first location on the physical object and the second point 304B corresponds to a second point on the physical object (504). For example, a user may interact with an input device of the electronic device 102, such as a touchscreen, to identify the first and second points 304A-B. In one or more implementations, the electronic device 102 identifies the edges of the representation 302 of the physical object in the image when the physical object is set against a uniform background. The electronic device 102 may then determine the first and second points 304A-B as two points along the edges of the representation 302 that are furthest from one another.

As the electronic device 102 is moved by the user, e.g. as discussed above with respect to FIG. 3, the electronic device 102 receives a series of images, e.g. images captured by the image capture device 204, that each include a representation 302 of the physical object and the electronic device 102 receives a corresponding series of sensor data items, e.g. from the sensor device 208 (506). The sensor data items may include, for example, acceleration data items, angular rate data items, or generally any data items that may be indicative of a position of the image capture device 204 at the time that the images were captured. Since the image capture device 204 is in motion as the series of images are captured, the position of the image capture device 204 may be non-constant across at least some of the series of images, and the sensor data items may be indicative of the change in position of the image capture device 204 across the series of images.

As the series of images are being received (506), the electronic device 102 tracks the first and second points 304A-B across each of the images (508) and displays each image, for example on the display device 210, with indications of the first and second points 304A-B overlaid onto the representation 302 of the physical object within each displayed image (510). Since the position of the image capture device 204 is non-constant across at least some of the images, the relative locations of the first and second points 304A-B within the captured images may change from image to image, and therefore may need to be tracked by the electronic device 102. Example user interfaces that include the first and second points 304A-B overlaid on a representation 302 of a physical object are discussed further above with respect to FIGS. 3 and 4.

In one or more implementations, the electronic device 102 uses image processing techniques to track the first and second points 304A-B across each of the images. For example, the electronic device 102 may determine a set of unique pixels encompassing each of the first and second points 304A-B and may search for the set of unique pixels in each image to track the first and second points 304A-B. In one or more implementations, the electronic device 102 may supplement the image processing techniques using the corresponding sensor data items. For example, the electronic device 102 may estimate locations of the first and second points 304A-B based on the estimated motion of the image capture device 204 as indicated by the corresponding sensor data items.

The electronic device 102 determines the first and second locations on the physical object (corresponding to the first and second points 304A-B) based at least on the series of images and the corresponding series of data items (512). For example, the electronic device 102 may perform a double integration on the accelerometer data items to determine the displacements of the image capture device 204 across the series of images, and/or the electronic device 102 may integrate the angular rate data items to determine the change in angles of the image capture device 204 across the series of images. The electronic device 102 may apply the sensor data items from multiple images of the series of images to one or more mathematical equations, such as the law of cosines, to determine the coordinates of the first and second locations on the physical object (512). Example determinations of the coordinates of the first and second locations on the physical object are discussed further below with respect to FIGS. 6-8.

The electronic device 102 determines the physical length of the physical object based at least on the distance between the coordinates of the first and second locations on the physical object (514). The electronic device 102 determines the accuracy of the determined physical length (516). In one or more implementations, the accuracy of the physical length may be based at least in part on the accuracy of the one or more sensor devices 208, such as the accelerometer and/or the rate gyroscope. The electronic device 102 then displays the captured image, for example, on the display device 210 including the indication 402 of the physical length of the physical object and one or more accuracy indicators 408 corresponding to the determined accuracy (518). In one or more implementations, the electronic device 102 may overlay the indication 402 of the physical length of the physical object onto the representation 302 of the physical object within the captured image, as is discussed further above with respect to FIG. 4. In one or more implementations, the electronic device 102 may indicate the accuracy of the determined physical length by overlaying circles onto the first and second points 304A-B within the captured image. The diameter of the circles may indicate the accuracy, for example, a smaller circle may indicate a higher accuracy.

In one or more implementations, the electronic device 102 may supplement and/or replace the law of cosines mathematical equation with one or more mathematical equations that include a correlation between the physical length of the physical object and the pixel length of the representation 302 of the physical object within the captured image. For example, if x represents the pixel length of the representation 302 of the physical object, d represents the distance from the image capture device 204 to the physical object, and f represents the focal length of the image capture device 204, then the physical length of the physical object, represented by X, can be calculated using the pinhole projection formula:

$$\frac{x}{f} = \frac{x}{d}.$$

In one or more implementations, if the image distance i is known, a calculation for X may also include the minor equation:

$$\frac{1}{f} = \frac{1}{d} + \frac{1}{i}.$$

In one or more implementations, d, the distance from the image capture device 204 to the physical object, may be a known value. For example, the electronic device 102 may instruct a user to hold the electronic device 102 a certain distance from the physical object, such as twelve inches, or generally any distance.

In one or more implementations, when the distance from the image capture device 204 to the physical object is known, the electronic device 102 may determine the coordinates of the first and second locations on the physical object (512) without utilizing and/or obtaining any accelerometer data items. For example, the electronic device 102 can integrate the angular rate data items from the rate gyroscope to determine the change in angles of the image capture device 204 across the series of images. The electronic device 102 may apply the change in angles and the known distance to the physical object to one or more mathematical equations, such as equations derived from the law of cosines, to determine the coordinates of the first and second locations on the physical object (512).

Figure 6:
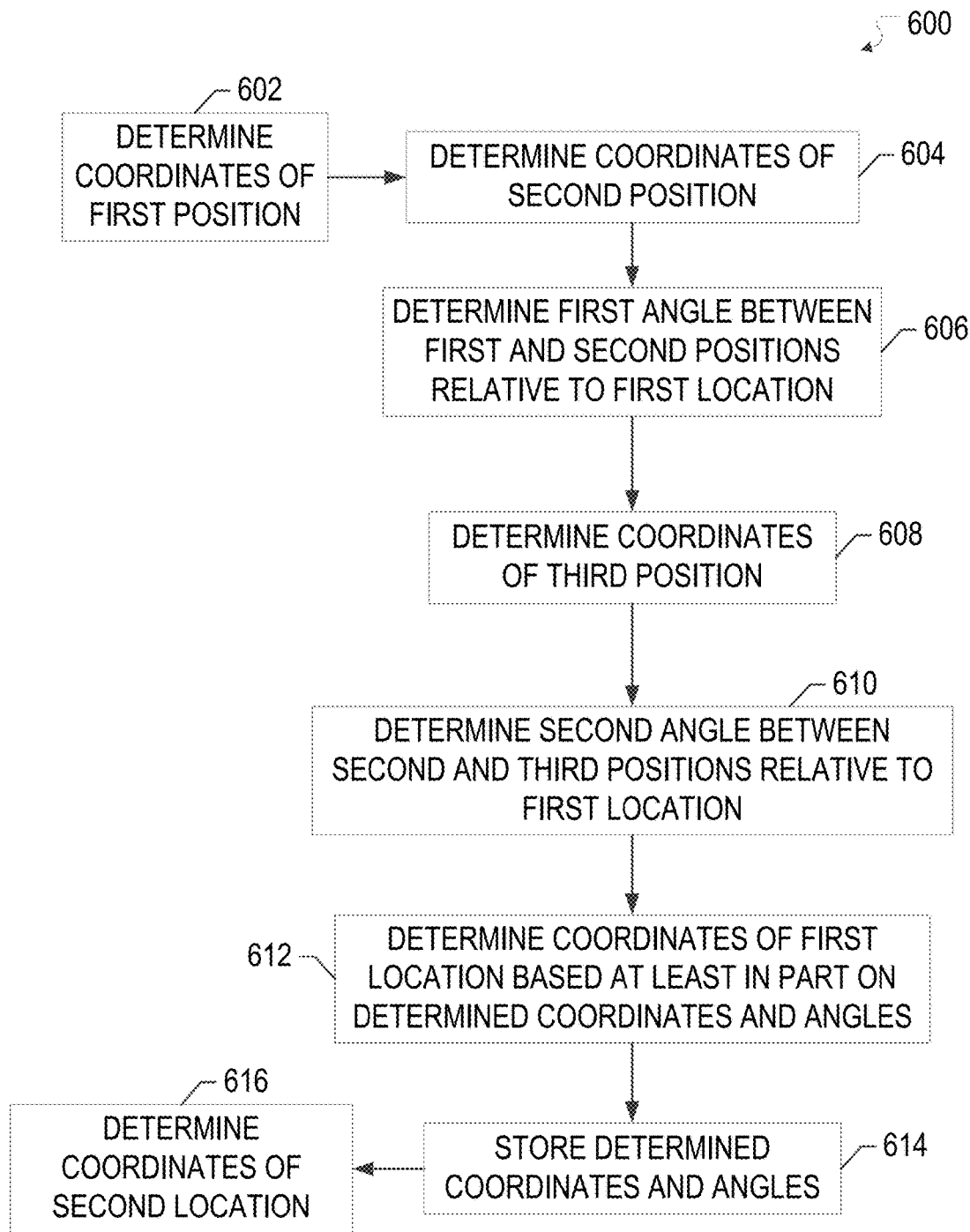
FIG. 6 illustrates a flow diagram of an example process of an electronic device in accordance with one or more implementations.

FIG. 6 illustrates a flow diagram of an example process 600 of an electronic device 102 in accordance with one or more implementations. For explanatory purposes, the example process 600 is primarily described herein with reference to the electronic device 102 of FIGS. 1-2; however, the example process 600 is not limited to the electronic device 102 of FIGS. 1-2, e.g. the example process 600 may be performed by one or more of the electronic devices 104, 106 and/or the server 110, and/or the example process 600 may be performed by one or more components of the electronic device 102. Further for explanatory purposes, the blocks of the example process 600 are described herein as occurring in serial, or linearly. However, multiple blocks of the example process 600 may occur in parallel. In addition, the blocks of the example process 600 may be performed a different order than the order shown and/or one or more of the blocks of the example process 600 may not be performed.

Figure 7:
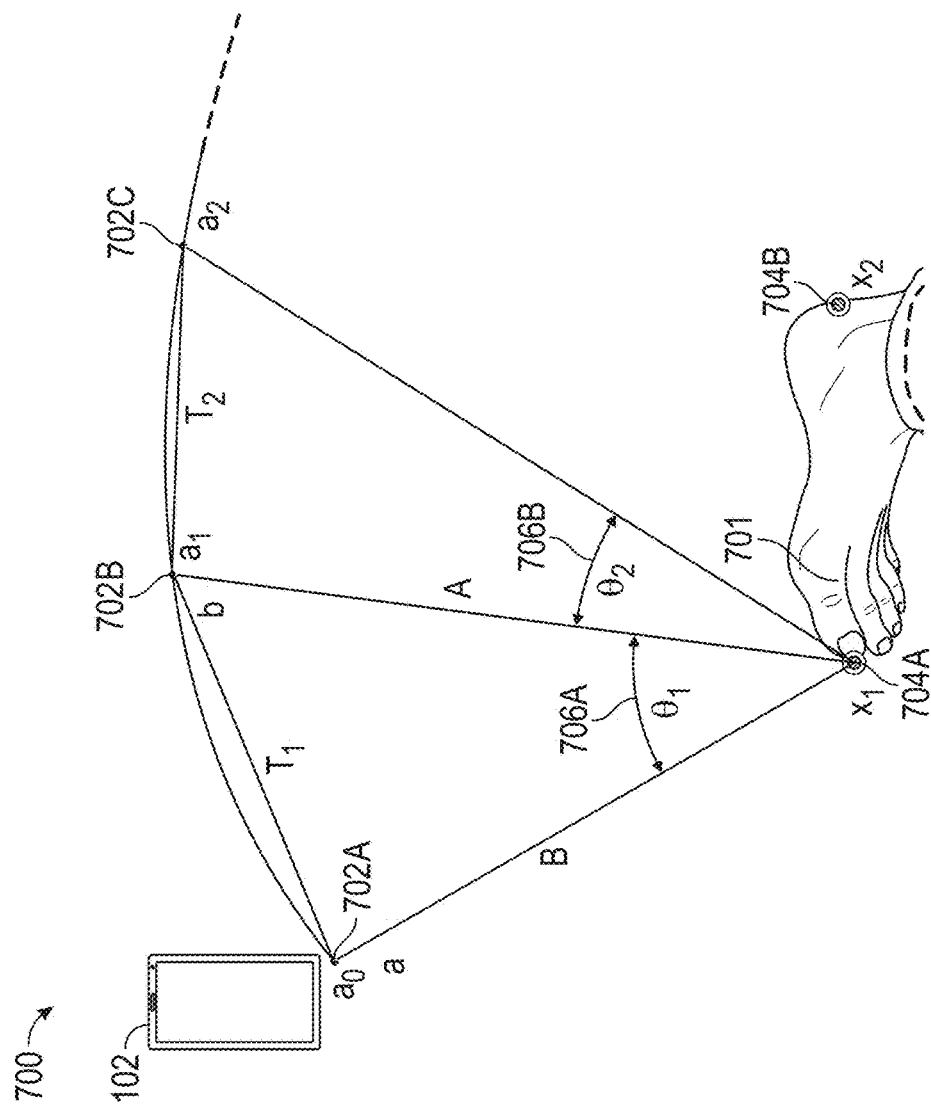
FIG. 7 illustrates an example motion diagram of an electronic device relative to a physical object having first and second locations in accordance with one or more implementations.

FIG. 7 illustrates an example motion diagram 700 of the electronic device 102 relative to a physical object 701 having first and second locations 704A-B in accordance with one or more implementations. For explanatory purposes, the motion diagram 700 is discussed within the context of the example process 600. However, the example process 600 is not limited to the example motion diagram 700, and vice-versa.

The electronic device 102 determines the coordinates of a first position 702A of the electronic device 102 (602) and the electronic device 102 captures an image of the physical object 701 at the first position 702A. In one or more implementations, the coordinates of the first position may be set to (0,0,0). The electronic device 102 is subsequently moved relative to the first location 704A on the physical object 701, such as via a rotational and/or translational movement, to a second position 702B, and the electronic device 102 captures an image of the physical object 701 at the second position 702B. For explanatory purposes, the second position 702B is illustrated as being displaced from the first position 702A, e.g. via a translational movement; however, the second position 702B may be rotated from the first position 702A, e.g. via a rotational movement.

The electronic device 102 determines the coordinates of the second position 702B (604). In one or more implementations, the electronic device 102 determines the coordinates of the second position 702B by performing a double integration on one or more acceleration data items generated by the one or more sensor devices 208, during the time that the electronic device 102 was moved from the first position 702A to the second position 702B.

In one or more implementations, the angular data items may be used to compensate for the rotation of the phone, so that the accelerometers can provide the acceleration in each of three axes: x, y, z. Thus, in each axis the coordinates of the first position 702A after elapsed time of $t_1$ may be given by the double integration: $a_1 = \int_0^{t1} \int(\ddot{x})dt$, where the value of $\ddot{x}$ is determined based at least in part on the accelerometer data items generated while the electronic device 102 was moved from the first position 702A to the second position 702B.

The electronic device 102 determines the first angle 706A between the first and second positions 702A-B relative to the first location 704A on the physical object 701 (606). The first angle 706A, formed by lines passing from the first location 704A to the first position 702A, and from the first location 704A to the second position 702B, may be determined by integrating the angular rate data items output by the sensor device 208, such as a rate gyroscope, using the following equation: $\theta_1 = \int_0^{t1}(\dot{\theta})dt$. The value of $\dot{\theta}$ is determined based at least in part on the angular rate data items generated while the electronic device 102 was moved from the first position 702A to the second position 702B. In one or more implementations, the first angle 706A may be determined by image processing, e.g., alternatively, or in addition, to the aforementioned equation.

The electronic device 102 is subsequently moved relative to the first location 704A on the physical object 701, such as via a rotational and/or translational movement, to a third position 702C, and the electronic device 102 captures an image of the physical object 701 at the third position 702C. The electronic device 102 determines the coordinates of the third position 702C (608) in the same and/or similar manner that the coordinates of the second position 702B were determined (604). The electronic device 102 determines the second angle 706B between the second and third positions 702B-C relative to the first location 704A on the physical object 701 (610) in the same and/or similar manner that the first angle was determined (606). The electronic device 102 may continue to determine additional positions and angles as the electronic device 102 is moved and images are captured, e.g. every millisecond, every second, or generally at any interval.

The electronic device 102 then determines the three-dimensional coordinates of the first location 704A ($x_1$) on the physical object 701 based at least in part on the determined coordinates and angles (612). For example, as shown in FIG. 7 the electronic device 102 may construct a first triangle with vertices at the coordinates of the first location 704A ($x_1$), the first position 702A ($a_0$), and the second position 702B ($a_1$). The edge of the triangle that passes from $a_0$ to $x_1$ may be labelled as B, the edge of the triangle that passes from $a_1$ to $x_1$ may be labelled as A, and the edge of the triangle that passes from $a_0$ to $a_1$ may be labeled as T. The edges labelled as A and B may also represent distances from the electronic device 102 and/or the image capture device 204 to the physical object 701. In one or more implementations, an assumption may also be made regarding the initial location of $x_1$ within the image to facilitate the determination, such as that $x_1$ is initially located within a particular region of the image.

The electronic device 102 may continue to construct triangles from the coordinates of each successive position of the electronic device 102. In one or more implementations, the electronic device 102 may determine the edges A and B of the triangles based on the law of cosines, e.g. $T^2 = A^2 + B^2 - 2AB \cos \theta_1$. The electronic device 102 may then determine $x_1$ based at least on the following equations: $A = |a_1 - x_1|$ and $B = |a_0 - x_1|$. An example calculation with example coordinates and example angles is discussed further below with respect to FIG. 8. In one or more implementations, if the distance from the image capture device 240 to the physical object 701 is known, e.g. the edges of the triangle labelled as A and B, the electronic device 102 may compute T and $x_1$ using an equation derived from the law of cosines, without receiving any accelerometer data items, e.g. without having measured values that correspond to the coordinates of $a_0$ and $a_1$.

After determining the three-dimensional coordinates of the first location 704A on the physical object 701 (612), the electronic device 102 stores the determined coordinates and angles with reference to the corresponding captured images (614). The electronic device 102 then determines the three-dimensional coordinates of the second location 704B ($x_2$) on the physical object 701, such as using similar calculations based on the stored values (616). The physical length of the physical object 701 may be determined by calculating the physical distance between the coordinates of the first and second locations 704A-B.

FIG. 8 illustrates an example motion diagram 810 of the electronic device 102 relative to a physical object 701 having first and second locations 704A-B and example MATLAB code 820 in accordance with one or more implementations. The motion diagram 810 includes four positions 802A-D of the electronic device 102 and three angles 806A-C that correspond to the four positions 802A-D. In the motion diagram 810, the first position 802A has the three-dimensional coordinates of (0,0,0), the second position 802B has the three-dimensional coordinates of (5,0,0), the third position 802C has the three-dimensional coordinates of (10,0,0), and the fourth position 802D has the three-dimensional coordinates of (15,0,0). In the motion diagram 810, the first angle 806A is 18.4°, the second angle 806B is 15.3°, and the third angle 806C is 11.3°.

The example MATLAB code 820 applies the equation corresponding to the law of cosines to the coordinates of the positions 802A-D and the angles 806A-C to determine the coordinates of the first location 704A, e.g. [0, −15, 0] cm, as shown in the results 830. Since the accuracy of the angle measurements is 0.1°, the accuracy of the coordinates of the first location 704A is approximately 0.1 cm.

Figure 9:
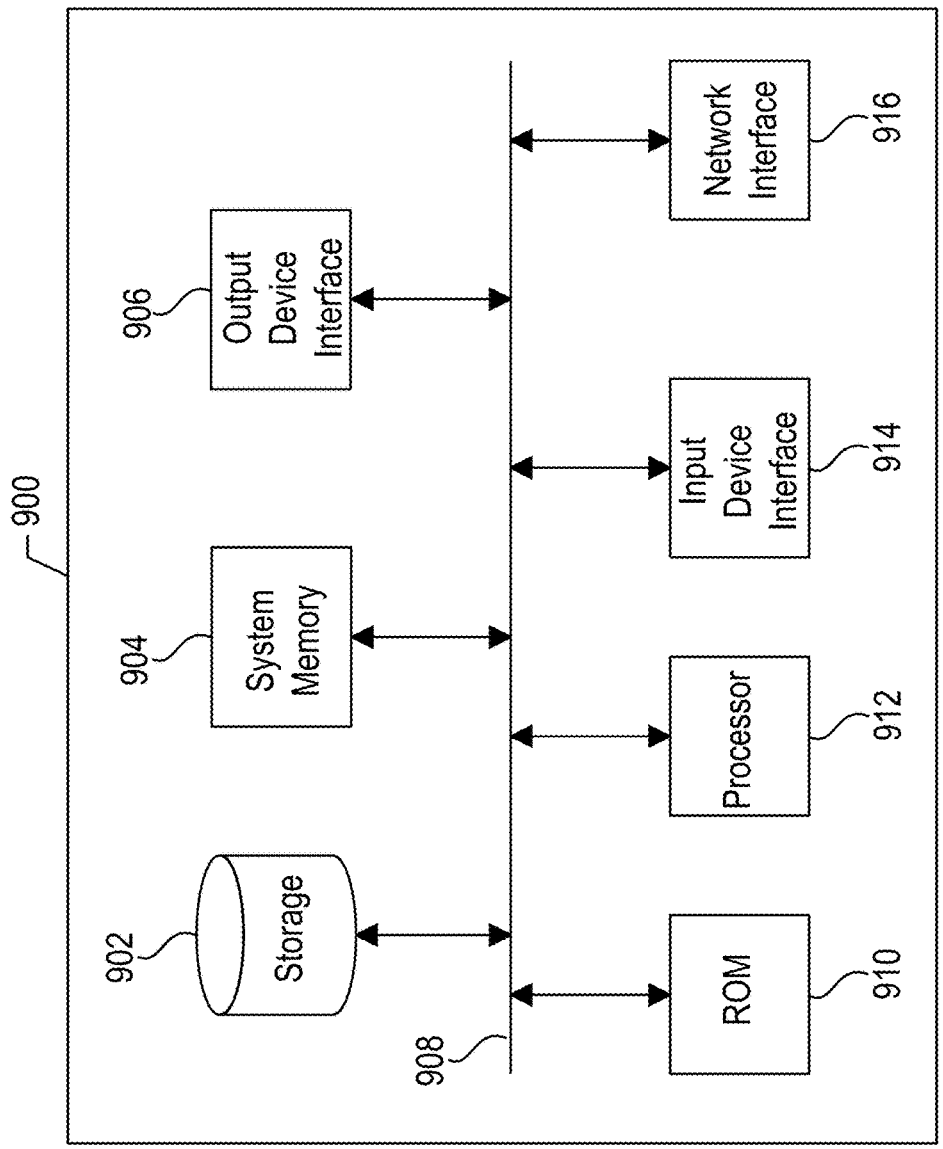
FIG. 9 conceptually illustrates an example electronic system with which one or more implementations of the subject technology can be implemented.

FIG. 9 conceptually illustrates an example electronic system 900 with which one or more implementations of the subject technology can be implemented. The electronic system 900, for example, may be, or may include, one or more of the electronic device 102, 104, 106, the server 110, one or more wearable devices, a desktop computer, a laptop computer, a tablet device, a phone, and/or generally any electronic device. Such an electronic system 900 includes various types of computer readable media and interfaces for various other types of computer readable media. The electronic system 900 includes a bus 908, one or more processing unit(s) 912, a system memory 904, a read-only memory (ROM) 910, a permanent storage device 902, an input device interface 914, an output device interface 906, one or more network interface(s) 916, and/or subsets and variations thereof.

The bus 908 collectively represents all system, peripheral, and chipset buses that communicatively connect the numerous internal devices of the electronic system 900. In one or more implementations, the bus 908 communicatively connects the one or more processing unit(s) 912 with the ROM 910, the system memory 904, and the permanent storage device 902. From these various memory units, the one or more processing unit(s) 912 retrieves instructions to execute and data to process in order to execute the processes of the subject disclosure. The one or more processing unit(s) 912 can be a single processor or a multi-core processor in different implementations.

The ROM 910 stores static data and instructions that are utilized by the one or more processing unit(s) 912 and other modules of the electronic system 900. The permanent storage device 902, on the other hand, may be a read-and-write memory device. The permanent storage device 902 may be a non-volatile memory unit that stores instructions and data even when the electronic system 900 is off. In one or more implementations, a mass-storage device (such as a magnetic or optical disk and its corresponding disk drive) may be used as the permanent storage device 902.

In one or more implementations, a removable storage device (such as a floppy disk, flash drive, and its corresponding disk drive) may be used as the permanent storage device 902. Like the permanent storage device 902, the system memory 904 may be a read-and-write memory device. However, unlike the permanent storage device 902, the system memory 904 may be a volatile read-and-write memory, such as random access memory (RAM). The system memory 904 may store one or more of the instructions and/or data that the one or more processing unit(s) 912 may utilize at runtime. In one or more implementations, the processes of the subject disclosure are stored in the system memory 904, the permanent storage device 902, and/or the ROM 910. From these various memory units, the one or more processing unit(s) 912 retrieve instructions to execute and data to process in order to execute the processes of one or more implementations.

The bus 908 also connects to the input and output device interfaces 914 and 906. The input device interface 914 enables a user to communicate information and select commands to the electronic system 900. Input devices that may be used with the input device interface 914 may include, for example, alphanumeric keyboards and pointing devices (also called "cursor control devices"). The output device interface 906 may enable, for example, the display of images generated by the electronic system 900. Output devices that may be used with the output device interface 906 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

As shown in FIG. 9, bus 908 also couples electronic system 900 to one or more networks (not shown) through one or more network interface(s) 916. The one or more network interface(s) may include BLUETOOTH interface, a BLE interface, a Zigbee interface, an Ethernet interface, a Wi-Fi interface, a multimedia over coax alliance (MoCA) interface, a reduced gigabit media independent interface (RGMII), or generally any interface for connecting to a network. In this manner, electronic system 900 can be a part of one or more networks of computers (such as a local area network (LAN), a wide area network (WAN), or an Intranet, or a network of networks, such as the Internet. Any or all components of electronic system 900 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as application specific integrated circuits (ASICs) or field programmable gate arrays (FPGAs). In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (e.g., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A device comprising:
   at least one processor circuit configured to:
   receive a selection of a first point and a second point on a representation of a physical object, the first point corresponding to a first location on the physical object and the second point corresponding to a second location on the physical object;
   receive, after receipt of the selection, a series of images from an image capture device, wherein each image of the series of images comprises the representation of the physical object;
   receive a series of sensor data items from at least one sensor device, wherein each of the series of sensor data items corresponds to one of the series of images; and
   determine a physical length of the physical object based at least in part on the series of images and the corresponding series of sensor data items.

2. The device of claim 1, wherein a position of the image capture device is non-constant for each image of the series of images.

3. The device of claim 2, wherein the at least one sensor device comprises an accelerometer and the series of sensor data items comprises a series of acceleration data items corresponding to changes in the position of the image capture device when each image of the series of images was captured by the image capture device.

4. The device of claim 3, wherein determining the length of the physical object comprises performing a double integration on the series of acceleration data items.

5. The device of claim 4, wherein the at least one sensor device comprises a rate gyroscope and the series of sensor data items comprises a series of angular rate data items corresponding to the changes in the position of the image capture device.

6. The device of claim 5, wherein determining the physical length of the physical object comprises performing an integration on the series of angular rate data items.

7. The device of claim 1,
   wherein the physical length of the physical object corresponds to a distance between the first point and the second point.

8. The device of claim 7, wherein the at least one processor circuit is further configured to:
   display, on a display device, each of the series of images with a first indicator on the selected first point and a second indicator on the selected second point.

9. The device of claim 1, wherein the at least one processor circuit is further configured to:

determine the physical length of the physical object based at least in part on a correlation between the physical length of the physical object and a pixel length of the representation of the physical object of at least one of the series of images.

10. The device of claim 9, wherein the physical object is a known distance from the image capture device and the correlation is based at last in part on a focal length of the image capture device, the known distance, and the pixel length of the representation of the physical object.

11. The device of claim 1, wherein physical object is a known distance from the image capture device, the at least one sensor device comprises a rate gyroscope, the series of sensor data items comprises a series of angular rate data items corresponding to changes in a position of the image capture device, and the at least one processor circuit is configured to:
determine a physical length of the physical object based at least in part on the series of images, the corresponding series of angular rate data items, and the known distance to the physical object.

12. A method comprising:
displaying an image that comprises a representation of a physical object, the image being received from an image capture device;
receiving an indication of a first point and a second point on the representation of the physical object, the first point corresponding to a first location on the physical object and the second point corresponding to a second location on the physical object;
receiving, from the image capture device and after receiving the indication of the first and second points, a series of images each comprising the representation of the physical object, wherein a position of the image capture device is non-constant for each image of the series of images;
receiving, from at least one sensor device, a series of sensor data items that corresponds to the series of images, wherein the position of the image capture device for each image of the series of images is determinable from each corresponding sensor data item; and
determining a physical distance between the first and second locations on the physical object based at least in part on the series of images and the series of sensor data items.

13. The method of claim 12, wherein the at least one sensor device comprises an accelerometer and the series of sensor data items comprises a series of acceleration data items, and determining the physical distance between the first and second locations on the physical object comprises performing a double integration on the series of acceleration data items.

14. The method of claim 12, wherein the at least one sensor device comprises a rate gyroscope, the series of sensor data items comprises a series of angular rate data items, and determining the physical distance between the first and second locations on the physical object comprises performing an integration on the series of angular rate data items and utilizing a known distance from the image capture device to the physical object.

15. The method of claim 12, further comprising:
displaying each image of the series of images along with a first indication of the first point and a second indication of the second point.

16. A computer program product comprising instructions stored in a tangible non-transitory computer-readable storage medium, the instructions comprising:
instructions to receive an image of a physical area captured by an image capture device;
instructions to determine a first point on the image and a second point on the image, wherein the first point corresponds to a first location of the physical area and the second point corresponds to a second location of the physical area;
instructions to receive, after determining the first and second points on the image, a series of images that include the first location and the second location of the physical area and a corresponding series of sensor data items that are indicative of a position of the image capture device when each image of the series of images was captured by the image capture device; and
instructions to determine a distance between the first location and the second location of the physical area based at least in part on at least some of the series of images and at least some of the series of sensor data items.

17. The computer program product of claim 16, wherein the position of the image capture device is non-constant for each image of the series of images.

18. The computer program product of claim 16, wherein the series of sensor data items comprises a series of acceleration data items, and determining the distance between the first location and the second location comprises performing a double integration on the series of acceleration data items.

19. The computer program product of claim 18, wherein the series of sensor data items comprises a series of angular rate data items and determining the distance between the first location and the second location comprises performing an integration on the series of angular rate data items.

20. The computer program product of claim 16, the instructions further comprising:
instructions to determine an accuracy of the determined distance; and
instructions to display the determined distance along with an indication of the determined accuracy.

* * * * *